US012601199B2

(12) United States Patent
Chen

(10) Patent No.: US 12,601,199 B2
(45) Date of Patent: Apr. 14, 2026

(54) HANDLE LOCK

(71) Applicant: Ningbo Eudemon Child Protective Equipment Co., Ltd., Ningbo (CN)

(72) Inventor: Yingfeng Chen, Ningbo (CN)

(73) Assignee: Ningbo Eudemon Child Protective Equipment Co., Ltd., Ningbo (CN)

( * ) Notice: Subject to any disclaimer, the term of this patent is extended or adjusted under 35 U.S.C. 154(b) by 164 days.

(21) Appl. No.: 18/351,817

(22) Filed: Jul. 13, 2023

(65) Prior Publication Data

US 2024/0360693 A1 Oct. 31, 2024

(30) Foreign Application Priority Data

Apr. 28, 2023 (CN) ........................ 202321067235.3

(51) Int. Cl.
*E05B 13/00* (2006.01)
*E05B 65/00* (2006.01)

(52) U.S. Cl.
CPC ........ *E05B 13/002* (2013.01); *E05B 65/0014* (2013.01)

(58) Field of Classification Search
CPC .. E05B 65/0014; E05B 13/002; E05B 13/004; E05B 13/106; E05B 13/108; E05B 1/00; E05B 1/0092; Y10T 292/57; Y10T 403/32942; E05C 1/14; E05C 3/08; Y10S 292/53; Y10S 292/54
USPC .......................................................... 16/392
See application file for complete search history.

(56) References Cited

U.S. PATENT DOCUMENTS

| | | | | |
|---|---|---|---|---|
| 2,542,038 A * | 2/1951 | Lewis | B25F 5/02 | 403/96 |
| 5,329,834 A * | 7/1994 | Wong | B25G 1/085 | 81/439 |
| 10,221,587 B1 * | 3/2019 | Bergman | E05B 13/002 | |
| 2007/0272060 A1 * | 11/2007 | Schoenbeck | B25G 1/066 | 81/177.8 |
| 2014/0102266 A1 * | 4/2014 | Huang | B25G 1/04 | 81/489 |
| 2019/0078351 A1 | 3/2019 | Marsden | | |
| 2020/0263461 A1 * | 8/2020 | Roukema | E05B 83/44 | |
| 2020/0354985 A1 * | 11/2020 | Xu | E05B 13/002 | |
| 2020/0392762 A1 | 12/2020 | Wang | | |
| 2021/0062550 A1 * | 3/2021 | Zhang | E05B 65/0007 | |

FOREIGN PATENT DOCUMENTS

| | | |
|---|---|---|
| CN | 109930904 A | 6/2019 |
| CN | 211473752 U * | 9/2020 |
| CN | 213627046 U | 7/2021 |
| KR | 102347158 B1 | 1/2022 |

* cited by examiner

*Primary Examiner* — Christine M Mills
*Assistant Examiner* — Peter H Watson

(57) ABSTRACT

The disclosure provides a handle lock. The handle lock includes a lock seat and a lock bar movably arranged on the lock seat, and is characterized in that the lock bar and a pivoting surface of the lock seat are arranged at an acute angle to a fixed surface of the lock seat, and the lock bar rotates around a pivot axis as a rotating shaft to switch between a locked state and an unlocked state, therefore, the rotation form of the handle lock of the disclosure is different from that of the existing handle locks.

8 Claims, 8 Drawing Sheets

HANDLE LOCK

TECHNICAL FIELD

The disclosure pertains to the field of child protection products, and specifically pertains to a handle lock fixed to a door body equipped with a door lock having lever handle to achieving an objective of locking or unlocking by rotating the lever handle of the door lock.

BACKGROUND

A door lock is a device for locking a door, which is widely used in households and public places. According to their structural principles, door locks can be divided into various types, one of which is lever handle lock. The lever handle lock has a lever handle that can be rotated in one or two directions to drive a lock core to work to achieve locking or unlocking. The lever handle lock is widely used for interior doors, such as bedroom doors. For families with children, it is necessary to prevent children from operating the lever handle lock to randomly open and close the interior doors, because such random operation may pinch fingers of the children or lock themselves.

In the prior art, there are some handle locks adapted to the lever handle lock, all of which achieve the purpose of protecting the safety of children by limiting rotation of the lever handle. For example, the Chinese invention patent application with No. CN109930904A discloses a door handle safety lock, which locks or unlocks a lever handle lock by rotating a limiting support arm and making the same keep in a locked or unlocked state, where a rotation axis of the limiting support arm is vertical and parallel to its fixed bottom surface, so that the limiting support arm is in a locked state when it is perpendicular to a door body, and is in an unlocked state when it is horizontally parallel to the door body. For another example, the Chinese utility model patent with No. CN213627046U discloses a handle protection lock. By sliding a lock body in a length direction of a lock seat, the protection lock makes the lock body located on a rotating path of the lever handle to prevent the lever handle from rotation or being away from the rotating path of the lever handle to unlock by sliding the lock body in the length direction of the lock seat. Alternatively, the South Korean patent with No. KR102347158B1 discloses a safety locking device for door handle, which is opened or closed by rotating an upper or lower lock piece around a horizontal pivot axis, so that the lever handle is locked or allowed to be rotated for locking or unlocking.

SUMMARY

The disclosure aims to provide a handle lock with a novel rotation mode of lock bars and being in good fit with a lever handle in locked and unlocked states.

As a first aspect of the disclosure, a handle lock is provided, including:

- a lock seat, where the bottom surface of the lock seat is formed as a fixed surface;
- at least one lock bar, where the lock bar is arranged on the lock seat in a pivotal and movable mode; and
- a pivoting surface, where the pivoting surface is formed between the lock bar and the lock seat, and a pivot axis is formed perpendicular to the pivoting surface.

A first end of the lock bar rotates around the pivot axis as a rotating shaft to switch between a locked state and an unlocked state.

The pivoting surface and the fixed surface are arranged at an acute angle. In the locked state, the lock bar is arranged away from the fixed surface, and when the lock bar rotates around the pivot axis leftwards or rightwards to enable a second end of the lock bar to approach the plane where the fixed surface is located, thereby forming the unlocked state.

In a preferred embodiment, the pivoting surface and the fixed surface are arranged at an angle of 45°.

As a second aspect of the disclosure, a handle lock is provided, including:

- a lock seat, where the bottom surface of the lock seat is formed as a fixed surface;
- at least one lock bar, where the lock bar is arranged on the lock seat in a pivotal and movable mode; and
- a pivoting surface, where the pivoting surface is formed between the lock bar and the lock seat, the pivoting surface and the fixed surface are arranged at an angle of 45°, and a pivot axis is formed perpendicular to the pivoting surface.

A first end of the lock bar rotates around the pivot axis as a rotating shaft to switch between a locked state and an unlocked state.

In the locked state, the lock bar is arranged in a way of being perpendicular to the fixed surface. When releasing the locking, the lock bar rotates around the pivot axis leftwards or rightwards to make the lock bar rotated to a position upwards or downwards to form an unlocked state.

A second end of the lock bar approaches the plane where the fixed surface is located, thereby forming the unlocked state.

As a third aspect of the disclosure, a handle lock is provided, including:

- a lock seat, where the bottom surface of the lock seat is formed as a fixed surface;
- two lock bars, where the two lock bars are arranged at the upper and lower ends of the lock seat in a pivotal and movable mode, respectively; and
- a pivoting surface, where the pivoting surface is formed between the lock bar and the lock seat, the pivoting surface and the fixed surface are arranged at an angle of 45°, and a pivot axis is formed perpendicular to the pivoting surface.

A first end of the lock bar rotates around the pivot axis as a rotating shaft to switch between a locked state and an unlocked state.

In the locked state, the lock bar is arranged in a way of being perpendicular to the fixed surface.

When releasing the locking, the lock bar rotates around the pivot axis leftwards or rightwards to make the two lock bars rotated to a position upwards or downwards to form an unlocked state at an angle of 180° between the two lock bars.

The handle lock provided in the disclosure has the following beneficial effects:

1. The lock bar rotates along the pivot axis arranged inclined relative to the bottom surface of the lock seat as a rotating shaft, so as to switch between a locked state and an unlocked state. In the locked state, the lock bar is arranged in the Z-axis direction perpendicular to the surface of the door body. In the unlocked state, the lock bar is preferably arranged in the direction upwards or downwards, and the state and unlocking process thereof are different from those of other existing handle locks.
2. In an optimal state, each lock bar is arranged close to the surface of the door body, thereby avoiding the possibility of injury because of being touched by children, and improving aesthetic and safety of the handle lock.

3. A limiting mechanism composed of the first limiting members and the second limiting member is arranged between the lock bars and the lock seat to limit and lock the rotation of the lock bars in the locked state or unlocked state, so that the handle lock can be kept in the locked state or unlocked state to avoid misoperation of adults or children, and also to avoid accidental locking of the lever handle caused by vibrations of door closing.
4. The rotation limiting of the lock bars can be unlocked in a variety of ways, such as pressing in the radial direction of the lock bars or pressing or pulling and pushing in the radial direction of the lock bars, so that the unlocking and state of rotation limiting of the lock bars are both completed through the lock bars, simplifying the operation and improving user experience.
5. The lock members and the lock seat are novel in structure design, all members are easy to manufacture and assemble, and the finished products have good stability and long service life.

Figure 1:
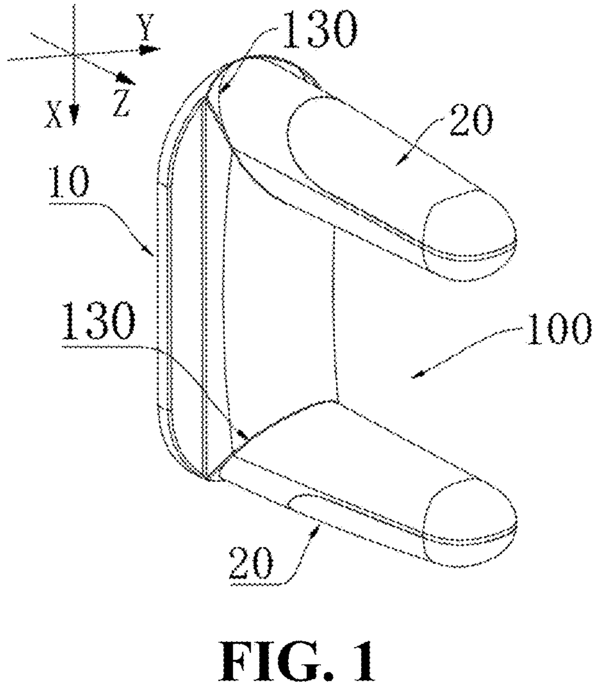
FIG. 1 is a schematic structural diagram of a handle lock in a locked state according to Embodiment 1 of the disclosure.
Figure 2:
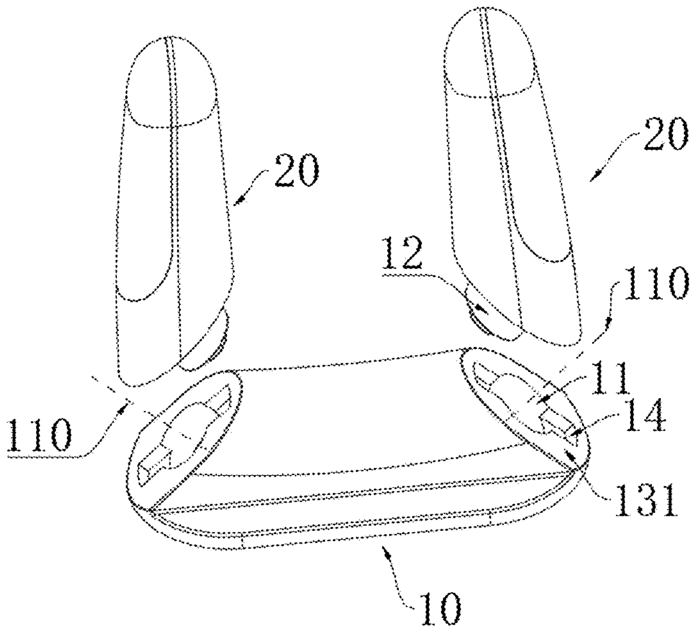
FIG. 2 is a structural exploded view of FIG. 1.
Figure 3:
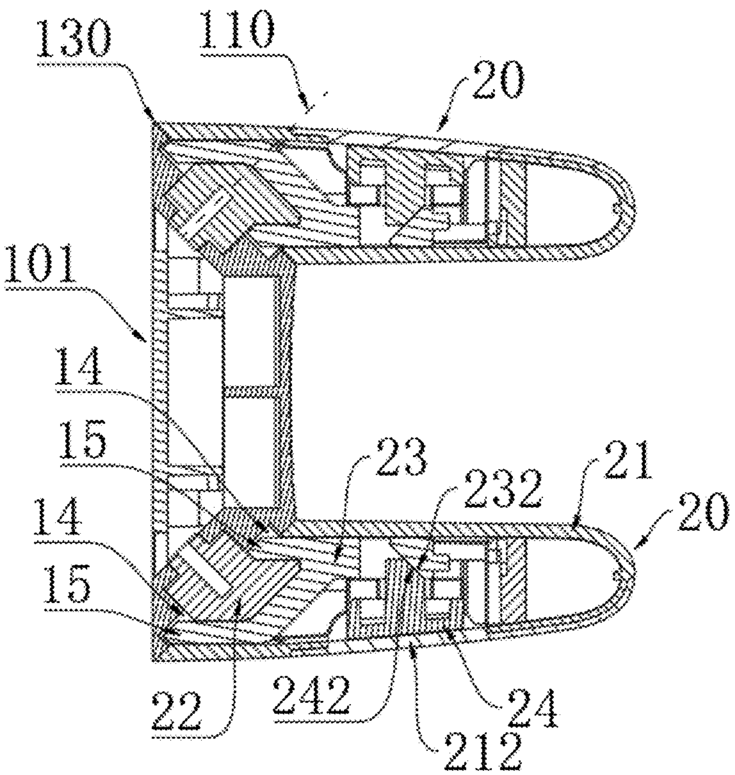
FIG. 3 is a structural schematic diagram of a sectional view of FIG. 1.
Figure 4:
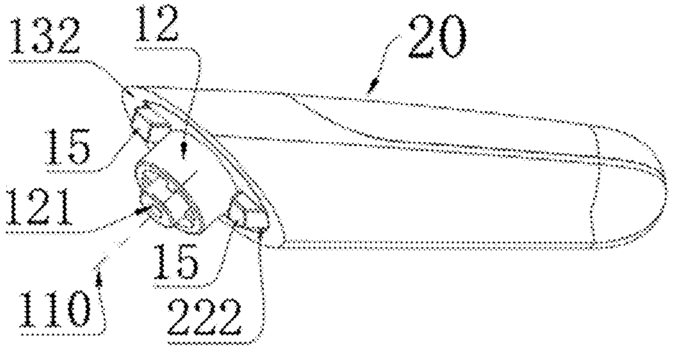
FIG. 4 is a schematic structural diagram of a lock bar in a limiting state according to an embodiment in FIG. 1.
Figure 5:
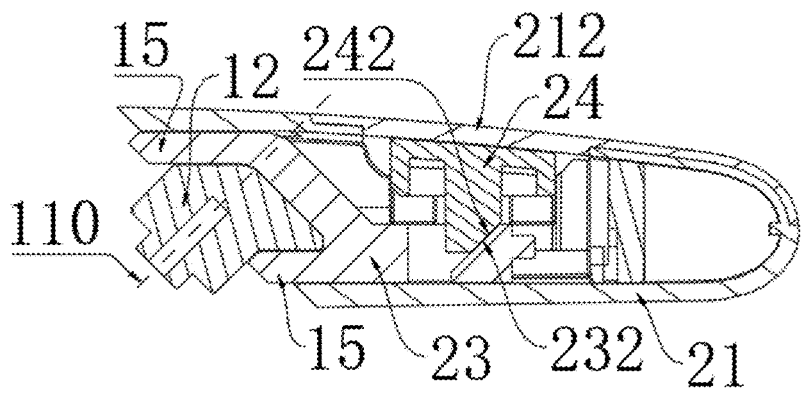
FIG. 5 is a structural schematic diagram of a sectional view of FIG. 4.
Figure 6:
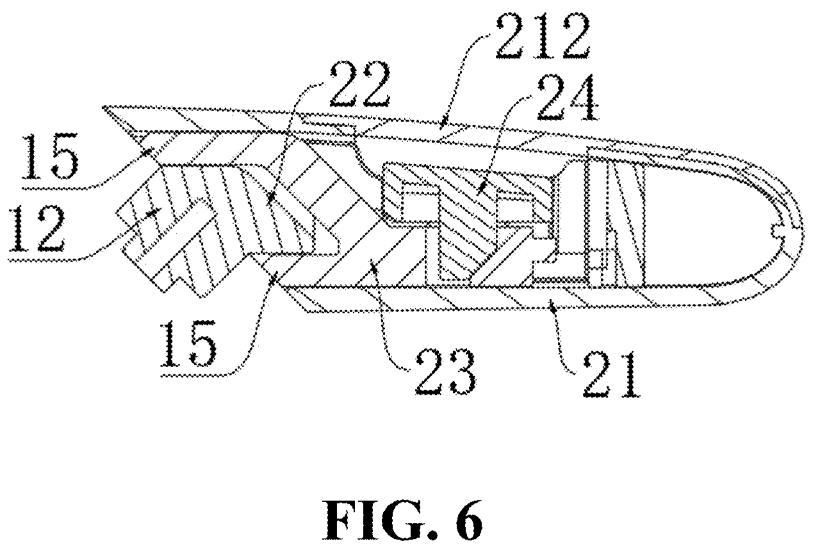
FIG. 6 is a structural schematic diagram of a sectional view of the lock bar in a non-limiting state of FIG. 5.
Figure 7:
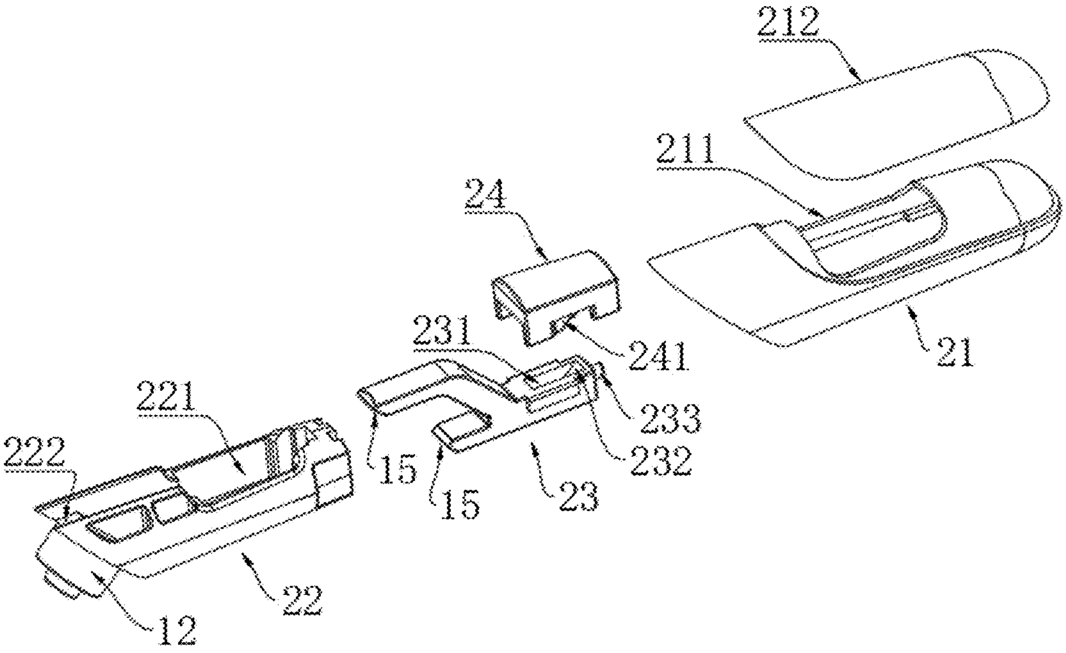
FIG. 7 is a structural exploded view of a lock bar according to the embodiment in FIG. 1.
Figure 8:
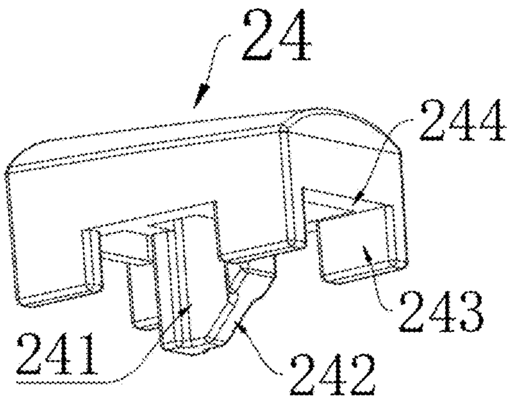
FIG. 8 is a structural schematic diagram of an unlocking member in FIG. 7.

In the accompany drawings, lock seat 10, lock bar 20, lock cavity 100, fixed surface 101, pivot axis 110, pivoting surface 130, first pivoting surface 131, second pivoting surface 132, first rotatable member 11, second rotatable member 12, connecting hole 121, first limiting member 14, second limiting member 15, retractable lock block 150, first guiding part 151, top member 16, fourth guiding part 161, lock bar sleeve 21, lock bar connecting member 22, lock tongue member 23, unlocking member 24, operating member hole 211, soft covering member 212, first operating cavity 221, limiting cavity 222, second operating cavity 231, third guiding part 232, spring seat 233, first guiding column 241, second guiding part 242, second guiding column 243, and guiding cavity 244.

DESCRIPTION OF THE EMBODIMENTS

Specific implementation structure of the disclosure will be described in detail below in conjunction with particular embodiments.

Embodiment 1

A handle lock used to be fixedly assembled on a surface of a door body to lock a door lock with a lever handle on the door body, so that the handle cannot rotate freely to lock or unlock.

The handle lock includes a lock seat 10 and lock bars 20 movably arranged on the lock seat 10, the bottom surface of the lock seat 10 is formed as a fixed surface 101, pivoting surfaces 130 are formed between the lock bars 20 and the lock seat 10, and the pivoting surfaces 130 and the fixed surface 101 are arranged at an angle of 45°. In order to form the pivoting surfaces 130, first pivoting surfaces 131 and second pivoting surfaces 132 are respectively formed on the lock seat 10 and the lock bars 20, the two surfaces are propped against each other, so that the lock bars 20 are pivotally rotated relative to the lock seat 10 in a way of being in contact with each other, and the axis of rotation is a pivot axis 110 perpendicular to the pivoting surfaces 130.

In order to realize that the lock bars 20 are arranged to rotate around the pivot axis 110 relative to the lock seat 10, first rotatable members 11 are arranged on the lock seat 10, each lock bar 20 is provided with a second rotatable member 12, each first rotatable member 11 is a cylindrical cavity, the second rotatable member 12 is a cylindrical member, and the cylindrical member is inserted into the cylindrical cavity, so that the lock bars 20 can be rotationally disposed. Apparently, the axis of the cylindrical member is the pivot axis 110. Further, a connecting hole 121 is also formed on the second rotatable member 12, and a fixing screw (not shown in the drawings) is in threaded fit with the connecting hole 121 to enable the lock seat 10 to be connected to the lock bars 20 in an extending direction of the pivot axis 110, so that the lock seat and the lock bars are combined in such a way that they can only rotate relative to each other but cannot be separated, and the fixing screw is formed as a connecting member, so that the lock seat 10 and the lock bars 20 form a relative pivot connection.

The rotation of a first end of the lock bars 20 around the pivot axis 110 as a rotating shaft can make the lock bars switch between a locked state and an unlocked state. In the locked state, the lock bars 20 are located on an unlocking path of the lever handle of the door lock to prevent the lever handle of the door lock from being rotated and unlocked, thereby achieving an objective of locking the door lock; in the unlocked state, the lock bars 20 rotate around the pivot axis 110 to deviate from the above locking position and to allow free rotation of the lever handle to unlock, thereby releasing the above locking. In the locked state, the lock bars 20 are arranged away from the fixed surface 101, and when the lock bars 20 rotate around the pivot axis 110 leftwards or rightwards to enable a second end of the lock bars 20 to approach the plane where the fixed surface 101 is located, thereby forming the unlocked state.

Figure 9:
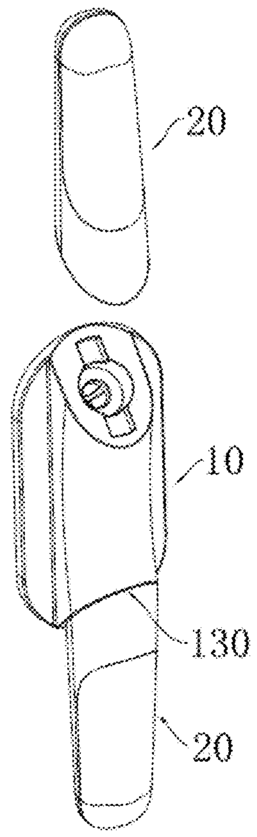
FIG. 9 is a schematic diagram of cooperation of the handle lock in an unlocked state according to the embodiment in FIG. 1, one of the lock bars is not illustrated.
Figure 10:
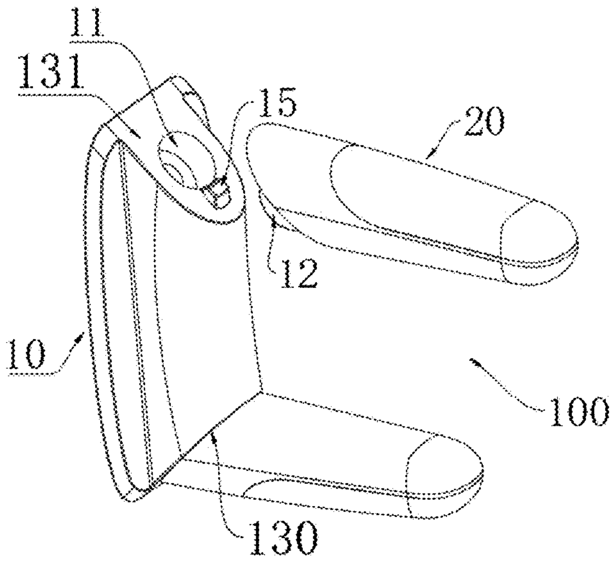
FIG. 10 is a structural exploded view of a handle lock in a locked state according to Embodiment 2 of the disclosure.
Figure 11:
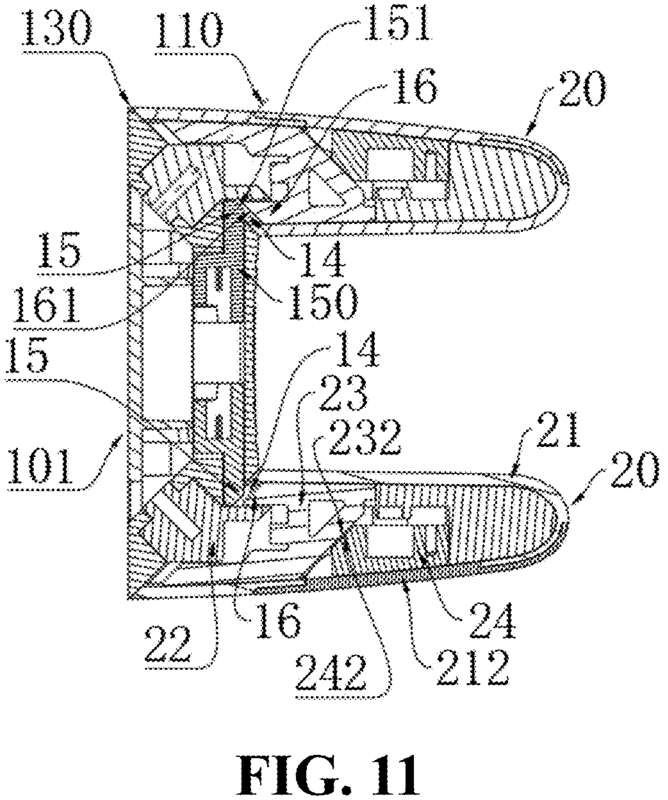
FIG. 11 is a sectional view of the handle lock in the locked state of the embodiment in FIG. 10.
Figure 12:
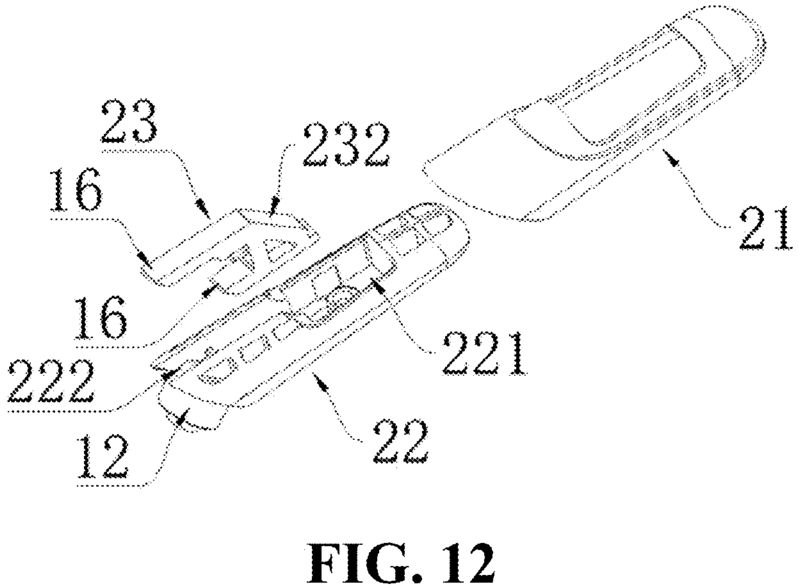
FIG. 12 is a structural exploded view of a lock bar body of the embodiment in FIG. 10, where a covering member and an unlocking member are not illustrated.
Figure 13:
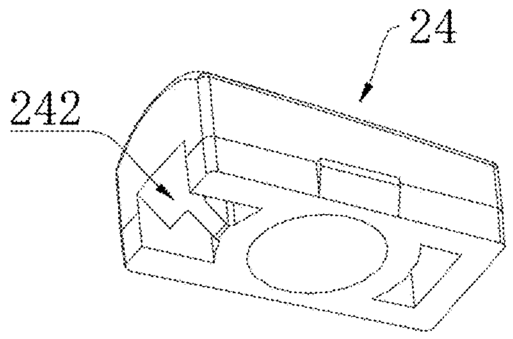
FIG. 13 is a structural schematic diagram of the unlocking member in FIG. 10.

As shown in FIG. 9, in the unlocked state, the two lock bars 20 can be rotated to a direction upwards or downwards respectively. During the process, the lock bars 20 first rotate along the Z-axis direction to roughly the Y-axis direction, and then further rotate to the X-axis direction. Of course, in some usage scenarios, only one of the two lock bars 20 can be rotated to a direction upwards or downwards, and the other thereof can be kept perpendicular to the door body (that is, at a position shown in FIG. 1), such that the objective of unlocking can also be achieved (that is, only the blocked lock bar 20 is rotated to release the locking). Further, in other embodiments, the lock bars 20 can also be rotated only by half of the above stroke to form an unlocked state (that is, the lock bars 20 are rotated to a position roughly facing the Y-axis direction, and are unable to be rotated fully in the Y-axis direction due to the angle of the pivoting surfaces 130), that is, they are rotated from the Z-axis direction to the Y-axis direction to release the locking. Alternatively, the rotation angle of the lock bars 20 can be further reduced, such as 45° or 60° or a smaller angle, which, in some embodiments, can also achieve an objective of driving the lock bars 20 to deviate from the unlocking path of the lever handle of the door lock.

In this embodiment, lock bars 20 are arranged at the upper and lower ends of the lock seat 10, respectively, so that a locking cavity 100 is formed between the two lock bars 20 when they are in the locked state, thereby the lever handle of the door handle is locked therein.

In order to improve the safety of the handle lock, make the lock bars 20 stay in the locked state to form a firm locking relationship, and keep the rotation of the lock bars 20 locked at least at the position, first limiting members 14 are arranged on the lock seat 10, second limiting members 15 are correspondingly arranged on the lock bars 20, the first limiting members 14 are the locking cavities, and the second limiting members 15 are lock tongues arranged in a mode of retractable movements. When the lock tongues are inserted in the locking cavities, the rotation of the locking bars 20 can be locked, so that the handle lock keeps in the locked state, and will not be unlocked due to a greater operation force or its rotation caused by touching the lock bars 20, and the like, and the safety of the handle lock is thus improved.

In this embodiment, the locking cavities used as the first limiting members 14 are composed of two, which are respectively arranged on two sides of each cylindrical cavity as the first rotatable member 11, so that the rotation of the lock bars 20 are locked separately in the locked state and the unlocked state, the handle lock can be kept in the locking and unlocked states from being accidentally unlocking or locking, and the safety thereof is further improved.

As shown in FIGS. 3-8, each lock bar 20 includes a lock bar sleeve 21 and a soft covering member 212 formed on the lock bar sleeve 21 by means of being wrapped with rubber, where the lock bar sleeve 21 is hollow inside to form a cavity, an operating member hole 211 is formed on a side wall thereof, and the soft covering member 212 is formed in a way of covering the operating member hole 211. Inside the cavity of each lock bar sleeve 21, a lock bar connecting member 22, a lock tongue member 23 and an unlocking member 24 are disposed, the lock bar connecting member 22 is fixedly connected to the lock bar sleeve 21, the lock tongue member 23 is arranged in a mode of retractable movements relative to the lock bar connecting member 22, and the unlocking member 24 is located at the operating member hole 211 and moves in a radial direction, so as to drive the lock tongue member 23 to retractably move in an axial direction. The unlocking member 24 and the lock tongue member 23 are respectively provided a second guiding part 242 and a third guiding part 232, the second guiding part 242 and the third guiding part 232 are both inclined planes, and make contact with each other to form a guiding fit, so that the radial displacement of the unlocking member 24 after being pressed can drive the lock tongue member 23 to retractably move in the axial direction. Each second limiting member 15 is formed at the end of the lock tongue member 23 or integrally formed with the lock tongue, so that it can make retractable movements in an axial direction together with the lock tongue member 23.

In this embodiment, limiting cavities 222 are formed on the upper and lower sides of the lock bar connecting member 22, respectively, two second limiting members 15 are disposed and located at the upper and lower sides of the lock bar connecting member 22, respectively; and a first operating cavity 221 is formed in the lock bar connecting member 22, so that the lock tongue member 23 and the unlocking member 24 can respectively move in the axial and radial directions in the first operating cavity.

Of course, in other embodiments, the unlocking members 24 and the lock tongue members 23 are directly fixed or integrally formed, so that the lock tongue members 23 can also be driven to retractably move in the axial direction by axial retractable movements of the unlocking members 24.

In this embodiment, a spring seat 233 is further arranged at the rear end of each lock tongue member 23, a reset spring (not shown in the drawings) is fixed on the spring seat 233 and is butted with the inner wall of the first operating cavity 221, so that the lock tongue member 23 maintains an extending trend relative to the lock bar connecting member 22, thereby keeping the locked state.

A second operating cavity 231 is formed on each lock tongue member 23, a first guiding column 241 is disposed on each unlocking member 24, the third guiding part 232 is arranged inside the second operating cavity 231, the second guiding part 242 is formed on the first guiding column 241, and the first guiding column 241 is inserted into the second operating cavity 231 to fit in with each other in a guiding mode. A plurality of second guiding columns 243 are further arranged on each unlocking member 24, a guiding cavity 244 is formed among second guiding columns 243, and at least a portion of the lock tongue member 23 fits in the guiding cavity 244, so that the unlocking member 24 is perpendicular to the moving direction of the lock tongue member 23.

The working process of the handle lock in this embodiment is as follows:

1. First, the handle lock is installed on the door body and its fixed position is matched with the position and rotation direction of the lever handle of the door lock, so that the handle lock can lock the rotation of the handle in a locked state. Preferably, the handle lock should be locked to be the locked position for fixed installation.
2. The lock bars 20 are kept in a state perpendicular to the fixed surface 101, and at least one of the lock bars 20 is located on the rotating path of the lever handle to lock the same; at the same time, the second limiting members 15 are inserted in and fit in with the first limiting members 14 to lock the rotation of the lock bars 20 relative to the lock seat 10.
3. When the door lock needs to be opened, the unlocking member 24 is pressed to make it radially displaced to drive the lock tongue member 23 to retract in the axial direction, so that the second limiting members 15 are disengaged from the first limiting members 14, and the lock bars 20 can rotate around the pivot axis 110 as a rotating shaft relative to the lock seat 10, so as to derivate from the rotating path of the lever handle, thereby allowing the door lock to be unlocked. During the process, the lock bars 20 first rotates from the Z-axis direction to the Y-axis direction and then further rotates to the X-axis direction, and the second limiting members 15 are re-inserted into the first limiting members 14 to hold the lock bars 20 at the same position.

4. When the door lock needs to be locked again, the unlocking member 24 is pressed, so that the second limiting members 15 are disengaged from the first limiting members 14 to reversely or further rotate the lock bars 20, until the lock bars 20 are in the Z-axis direction, and the second limiting members 15 are inserted into the first limiting members 14 to hold the lock bars 20.

Embodiment 2

This embodiment provides a handle lock, the main structure of which is the same as that of Embodiment 1, but differs in that: in this embodiment, each second limiting member 15 (which is arranged on the lock tongue member 23 in Embodiment 1) is actuated by the lock tongue member 23 to disengage from the first limiting members 14, so as to release the rotational locking of the lock bars 20.

As shown in FIGS. 10-13, two retractable lock blocks 150 are arranged inside the lock seat 10, and the second limiting members 15 are formed on the retractable lock blocks 150 and are arranged in a mode of retractable movements in a way of being exposed to the lock seat 10. In order to keep the second limiting members 15 extended, a reset spring (not shown in the drawings) can be arranged between the two retractable lock blocks 150 or between each retractable lock block 150 and the lock seat 10.

One first limiting member 14 is arranged on the front end of each lock bar 20, the lock tongue member 23 is also arranged in a mode of retractable movements in the radial direction, a top member 16 is formed at the front end thereof, and the top member 16 is arranged inside each first limiting members 14 in a mode of retractable movements; further, a first guiding part 151 is disposed on each limiting member 15, a fourth guiding part 161 is arranged on each top member 16, and at least one of the first guiding part 151 or the fourth guiding part 161 is an inclined surface or a curved surface for forming a guiding fit in a way that the two are butted up against each other. When the top member 16 is displaced in the axial direction of the lock bars 20 together with the lock tongue member 23, the guiding fit between the first guiding part 151 and the fourth guiding part 161 makes the second limiting members 15 displaced in the radial direction of the lock bars 20, so that the lock bars are disengaged from the first limiting members 14 to release the rotational locking of the lock bars 20 relative to the lock seat 10, and the lock bars 20 can rotate around the pivot axis 110 to switch between a locked state and an unlocked state.

In this embodiment, the first guiding part 151 and the fourth guiding part 161 are both inclined surfaces, and the axial retractable movements of the lock tongue member 23 along the lock bars 20 are realized through the displacement caused by pressing the unlocking members 24 in the radial direction.

Embodiment 3

This embodiment provides a handle lock, the main structure of which is the same as that of Embodiment 2, but differs in that: in this embodiment, axial retractable movements of the lock tongue member 23 along the lock bars 20 are directly operated, rather than being driven by guiding fit of the displacement of the unlocking member 24 in the radial direction.

Figure 14:
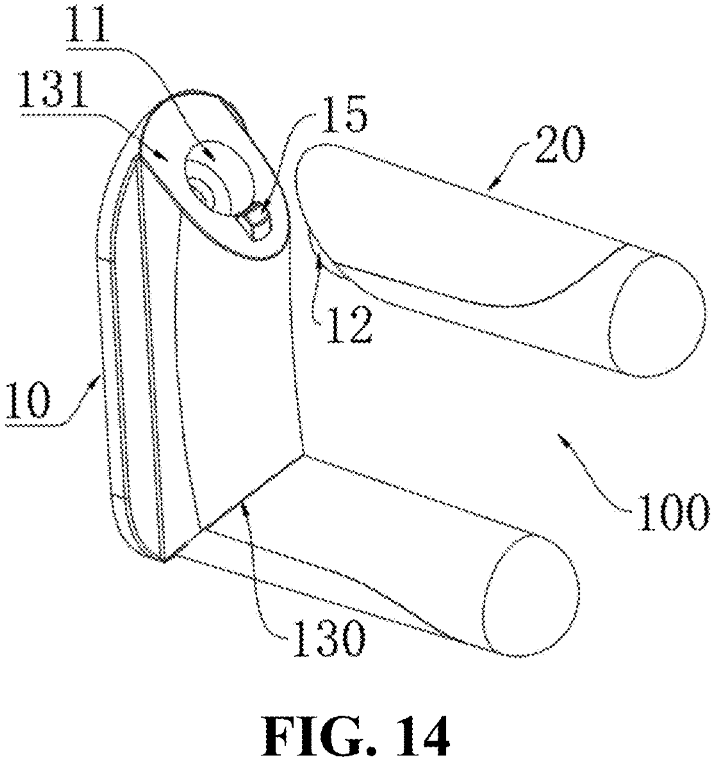
FIG. 14 is a structural exploded view of a handle lock in a locked state according to Embodiment 3 of the disclosure.
Figure 15:
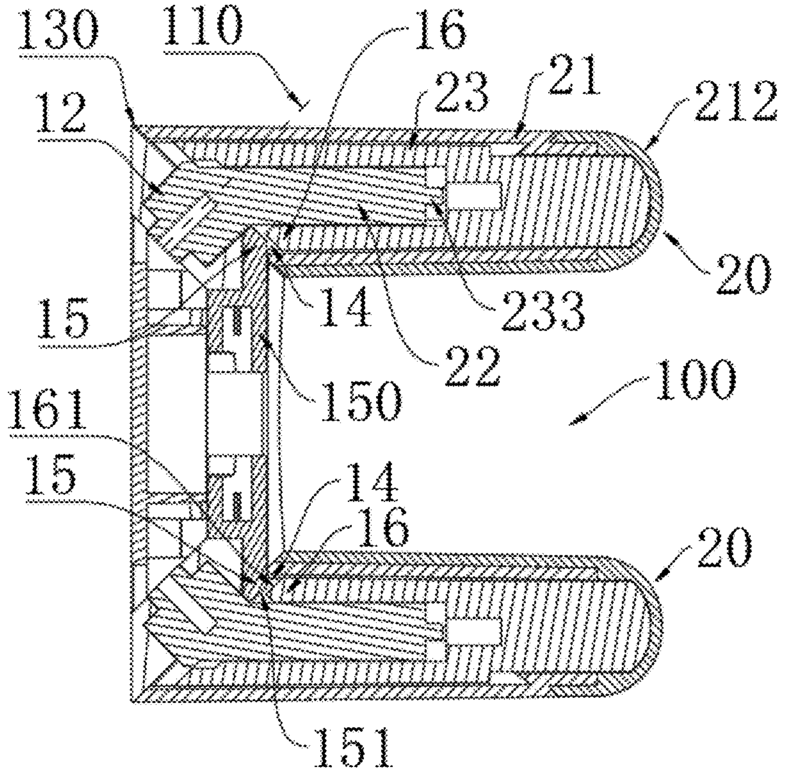
FIG. 15 is a sectional view of the handle lock in the locked state of the embodiment in FIG. 14.
Figure 16:
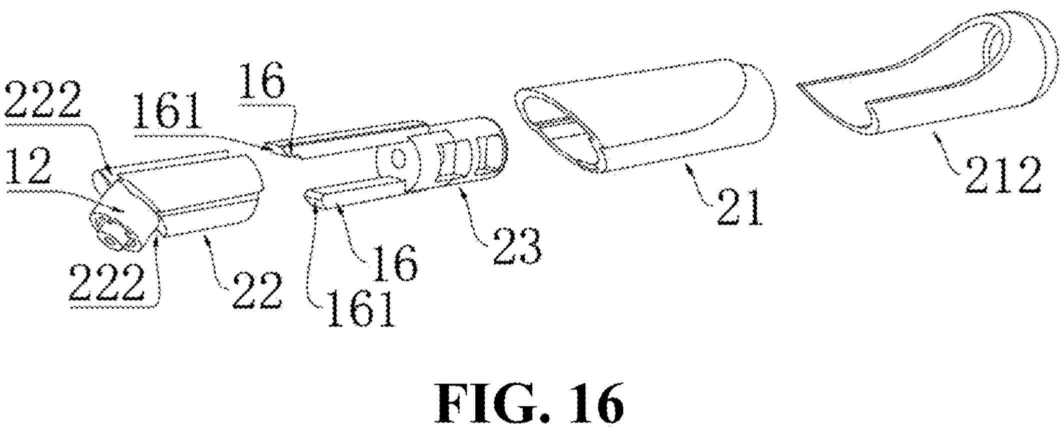
FIG. 16 is a structural exploded view of the handle lock of the embodiment in FIG. 14.

As shown in FIGS. 14-16, the second end of the locking lever 20 is formed as a pressing operation part, the lock tongue member 23 is a rod-shaped member arranged in an axial direction of the lock bars 20, the second limiting members 15 are formed at the inner end of the lock tongue member 23 (that is, a first end thereof), and an outer end of the lock tongue member 23 is covered by the soft covering member 212 for pressing.

In this embodiment, the spring seat 233 is arranged on the outer side of the lock bar connecting member 22, the reset spring (not shown in the drawings) is fixed on the spring seat 233 and acts between the spring seat 233 and the lock tongue member 23, so that the top member 16 is kept away from the first limiting members 14, only when being pressed, the top member 16 can extend into the first limiting members 14, so that the second limiting members 15 are pushed out, and the second limiting members 15 are then disengaged from the first limiting members 14 to release the rotational locking of the lock bars 20.

What is claimed is:

1. A handle lock, comprising:

a lock seat, wherein a fixed surface is formed at a bottom surface of the lock seat;

two lock bars, wherein each of the two lock bars is arranged on the lock seat in a pivotal and movable mode;

two pivoting surfaces arranged at an angle of 45° to the fixed surface, wherein each of the two pivoting surfaces is arranged between each of the two lock bars and the lock seat, and two pivot axes arranged perpendicular to the two pivoting surfaces, wherein the two lock bars rotate around each of the two pivot axes at first ends thereof to switch between a locked state and an unlocked state;

in the locked state, the two lock bars are arranged away from the fixed surface, and when the two lock bars rotate around each of the two pivot axes leftwards or rightwards to enable a second end of the two lock bars to approach a plane where the fixed surface is located, thereby forming the unlocked state;

wherein first rotatable members are arranged on the lock seat, the two lock bars are each provided with a second rotatable member, the first rotatable members are each a cylindrical cavity, the second rotatable member is a cylindrical member, the cylindrical member is inserted into the cylindrical cavity, so that the two lock bars are rotatably arranged on the lock seat, and the center line of the cylindrical member is the two pivot axes;

the two lock bars each comprise a lock bar sleeve, a lock bar connecting member and a lock tongue member, the lock bar connecting member and the lock tongue member are installed in a cavity formed by the hollow inside of the lock bar sleeve, the lock bar connecting member is fixedly connected to the lock bar sleeve, the lock tongue member is arranged in a mode of retractable movements relative to the lock bar connecting member in a length direction of the two lock bars, and the second rotatable member is arranged at a first end of the lock bar connecting member;

first limiting members are arranged on the lock seat, a second limiting member is arranged on each of the two lock bars, the second limiting member is a lock tongue and formed at a first end of the lock tongue member, limiting cavities are formed on an upper and a lower side of the lock bar connecting member respectively, two second limiting members are disposed and assembled in the limiting cavities respectively, and the first limiting members are composed of locking cavities and are arranged on an upper side and a lower side of the cylindrical cavity; and when the lock bar connecting member extends toward the first ends of the two lock bars, the two second limiting members extend into the first limiting members to lock the rotation of the two lock bars to form the locked state; and when the lock bar connecting member is displaced toward second ends of the two lock bars, the two second limiting members are disengaged from the first limiting members to release the rotational locking of the two lock bars to form the unlocked state.

2. The handle lock according to claim 1, wherein an operating member hole is formed on a side wall of the lock bar sleeve, the unlocking member is installed in the operating member hole in a radial direction, the unlocking member and the lock tongue member are respectively provided a second guiding part and a third guiding part, at least one of the second guiding part and the third guiding part is an inclined surface or a curved surface to press the unlocking member to displace in the radial direction to drive the lock tongue member to retractably move in the axial direction, so that the second limiting member extends into or is disengaged from the first limiting members.

3. The handle lock according to claim 2, wherein the two lock bars are arranged in a Z-axis direction in the locked state, and the two lock bars are arranged in an X-axis or a Y-axis direction in the unlocked state.

4. The handle lock according to claim 3, wherein a reset member is provided between the lock tongue member and the lock bar sleeve, so that the second limiting member maintains an extending trend under the action of the reset member.

5. The handle lock according to claim 4, wherein a first operating cavity is provided in the lock bar connecting member, the lock tongue member is arranged in the first operating cavity in the axial direction in a movable mode, and the unlocking member is arranged in the first operating cavity in the radial direction in a movable mode.

6. The handle lock according to claim 5, wherein a second operating cavity is formed on a second end of the lock tongue member, a first guiding column is disposed on the unlocking member, the third guiding part is arranged inside the second operating cavity, the second guide part is formed on the first guiding column, and the first guiding column is inserted into the second operating cavity; and a plurality of second guiding columns are further arranged on the unlocking member, a guiding cavity is formed among second guiding columns, and the second end of the lock tongue member fits in the guiding cavity, so that the unlocking member is perpendicular to the moving direction of the lock tongue member.

7. The handle lock according to claim 6, wherein first pivoting surfaces are provided on the lock seat, and second pivoting surfaces are provided on the two lock bars, the first pivoting surface and the second pivoting surface are propped against each other when the two lock bars are mounted to the lock seat to form the pivoting surface; and a soft covering member is provided around the operating member hole, the soft covering member is arranged in a way of covering the operating member hole, and the reset member is a reset spring.

8. A handle lock, comprising:

a lock seat, wherein a fixed surface is formed at a bottom surface of the lock seat;

two lock bars, wherein the two lock bars are respectively arranged at an upper and a lower end of the lock seat in a pivotal and movable mode;

two pivoting surfaces arranged at an angle of 45° to the fixed surface, wherein each of the two pivoting surfaces is arranged between the two lock bars and the lock seat, and two pivot axes arranged perpendicular to the two pivoting surfaces, wherein the two lock bars are arranged rotatable around each of the two pivot axes at first ends thereof to switch between a locked state and an unlocked state;

in the locked state, the two lock bars are arranged in a way of being perpendicular to the fixed surface;

when releasing the locking, the two lock bars rotate around each of the two pivot axes leftwards or rightwards to make the two lock bars rotated to a position upwards or downwards to form the unlocked state in which the two lock bars are at an angle of approximately 180° to each other;

wherein first rotatable members are arranged on the lock seat, the two lock bars are each provided with a second rotatable member, the first rotatable members are each a cylindrical cavity, the second rotatable member is a cylindrical member, the cylindrical member is inserted into the cylindrical cavity, so that the two lock bars are rotatably arranged on the lock seat, and the center line of the cylindrical member is the two pivot axes;

the two lock bars each comprise a lock bar sleeve, a lock bar connecting member and a lock tongue member, the lock bar connecting member and the lock tongue member are installed in a cavity formed by the hollow inside of the lock bar sleeve, the lock bar connecting member is fixedly connected to the lock bar sleeve, the lock tongue member is arranged in a mode of retractable movements relative to the lock bar connecting member in a length direction of the two lock bars, and the second rotatable member is arranged at a first end of the lock bar connecting member;

first limiting members are arranged on the lock seat, a second limiting member is arranged on each of the two lock bars, the second limiting member is a lock tongue and formed at a first end of the lock tongue member, limiting cavities are formed on an upper and a lower side of the lock bar connecting member respectively, two second limiting members are disposed and assembled in the limiting cavities respectively, and the first limiting members are composed of locking cavities and are arranged on an upper side and a lower side of the cylindrical cavity;

when the lock bar connecting member extends toward the first ends of the two lock bars, the two second limiting members extend into the first limiting members to lock the rotation of the two lock bars to form the locked state; and when the lock bar connecting member is displaced toward second ends of the two lock bars, the two second limiting members are disengaged from the first limiting members to release the rotational locking of the two lock bars to form the unlocked state; and first pivoting surfaces are provided on the lock seat, and second pivoting surfaces are provided on the two lock bars, the first pivoting surface and the second pivoting surface are propped against each other when the two lock bars are mounted to the lock seat to form the two pivoting surfaces.

* * * * *